US012565988B2

(12) United States Patent
Kang

(10) Patent No.: US 12,565,988 B2
(45) Date of Patent: Mar. 3, 2026

(54) SOLAR CELL STREET LIGHTS ASSEMBLY

(71) Applicant: TOP SYSTEM CO., LTD., Gyeonggi-do (KR)

(72) Inventor: Taewook Kang, Gyeonggi-do (KR)

(73) Assignee: TOP SYSTEM CO., LTD., Gyeonggi-do (KR)

( * ) Notice: Subject to any disclaimer, the term of this patent is extended or adjusted under 35 U.S.C. 154(b) by 0 days.

(21) Appl. No.: 19/274,817

(22) Filed: Jul. 21, 2025

(65) Prior Publication Data

US 2026/0029118 A1 Jan. 29, 2026

(30) Foreign Application Priority Data

Jul. 23, 2024 (KR) ........................ 10-2024-0097550

(51) Int. Cl.

| | |
|---|---|
| ***F21S 8/08*** | (2006.01) |
| ***F21S 9/02*** | (2006.01) |
| ***F21S 9/03*** | (2006.01) |
| ***F21V 23/00*** | (2015.01) |
| ***F21V 23/02*** | (2006.01) |
| ***F21V 29/503*** | (2015.01) |
| ***F21V 29/508*** | (2015.01) |
| ***F21V 29/60*** | (2015.01) |
| ***F21V 29/61*** | (2015.01) |
| ***F21V 29/76*** | (2015.01) |
| ***F21V 31/03*** | (2006.01) |

(Continued)

(52) U.S. Cl.

CPC ............ *F21V 29/508* (2015.01); *F21S 8/086* (2013.01); *F21S 9/026* (2013.01); *F21S 9/037* (2013.01); *F21V 23/006* (2013.01); *F21V 23/023* (2013.01); *F21V 29/503* (2015.01); *F21V 29/61* (2015.01); *F21V 29/76* (2015.01); *F21V 31/03* (2013.01); *F21W 2131/103* (2013.01); *F21Y 2115/10* (2016.08)

(58) Field of Classification Search

CPC ..... F21S 8/086; F21V 29/60; F21W 2131/103
See application file for complete search history.

(56) References Cited

U.S. PATENT DOCUMENTS

2008/0285265 A1 * 11/2008 Boissevain ............. F21V 29/74
362/218

FOREIGN PATENT DOCUMENTS

KR 1020070097004 10/2007
KR 100898062 B1 * 5/2009 .............. F21S 13/10

(Continued)

*Primary Examiner* — Sean P Gramling
(74) *Attorney, Agent, or Firm* — IPLA P.A.

(57) ABSTRACT

A solar cell street lights assembly includes: a vertical pillar fixed to a ground; a hollow mounting rod obliquely connected upward from an upper end portion of the vertical pillar; a lower housing having a first receiving portion; a mounting hole for mounting a LED module formed on the other side; an upper housing mounted on an upper surface portion of the lower housing to form an internal space (A) together with the lower housing and having one end connected to the mounting rod, an outlet for discharging air introduced through the hollow portions, and a solar panel mounted and fixed on an upper surface thereof; a hollow air conduit for introducing external air from a lower portion thereof arranged parallel to the vertical pillar; and at least one air passage pipe having one end connected to the air conduit and passing through the second receiving portion.

11 Claims, 15 Drawing Sheets

(51) Int. Cl.
*F21W 131/103* (2006.01)
*F21Y 115/10* (2016.01)

(56) References Cited

FOREIGN PATENT DOCUMENTS

| | | |
|---|---|---|
| KR | 1020200124809 | 11/2020 |
| KR | 1020220005863 | 1/2022 |

* cited by examiner

SOLAR CELL STREET LIGHTS ASSEMBLY

BACKGROUND

The present invention relates to a solar cell street lights assembly which accelerates the internal airflow of a vertical streetlight pillar using a vertical wind path of natural wind, i.e., an air pressure difference, to cool a PCB, a solar panel, an LED module, and a battery, thereby preventing errors in the PCB electrical circuit caused by high temperature from direct sunlight, a decrease in the power generation of the solar panel, a decline in battery performance caused by high heat, and a shortened lifespan of the LED.

Furthermore, the present invention relates to a solar cell street lights assembly which improves the structure of a wind power fan to enable forward and reverse rotation, thereby increasing power generation efficiency, and which not only increases battery efficiency but also enables auxiliary charging of the battery by using wind power generation to insulate the battery in the winter and minimize overcooling even in an environment where rain, wind, or snowstorms occur.

Additionally, the present invention relates to a solar cell street lights assembly that prevents contamination of solar panels by birds and allows foreign substances such as sand and fine dust to be smoothly removed through natural ventilation.

In general, street lights have the problem of high power consumption because they use light bulbs, which are power-consuming light sources. Currently, there is a trend toward applying LEDs, which consume less power, have high luminous efficiency, and can be used semi-permanently, to streetlights.

However, since these LEDs cannot meet the high brightness required for street lights with just one LED, several to several dozen LEDs are connected to each other to form a module to achieve high brightness, and these modules are connected in series or parallel to form a single lamp to meet the high brightness required for lighting such as street lights.

In this way, when LED lighting consisting of modules composed of multiple LEDs is turned on for a long period of time, heat generation is accelerated because they are placed inside a housing, and LEDs with low heat resistance may have their efficiency reduced by the heat and the lighting may break down. Therefore, the lighting using the LEDs should have a cooling structure to dissipate the heat of the LEDs and prevent breakdown due to overheating.

In addition, the generation efficiency of the solar panel decreases due to high temperatures caused by direct sunlight, and when the street lights operate using a battery, prolonged use can lead to battery overheating, resulting in reduced power efficiency.

To overcome these problems, Korean Patent Publication No. 2007-0097004 (Cooling device for lighting with built-in power light-emitting diode) provides a streetlight that uses a power LED chip, which is a high-brightness LED, and discloses a method of forced cooling using cooling water to cool the heat generated from the power LED chip. However, this also has the inconvenience of having to operate a separate cooling device because it adopts a forced cooling method, and its structure is also complex, so it has the disadvantage of requiring enormous costs for installation and manufacturing.

Moreover, Koran Patent Registration No. 10-2260208 discloses a technology for performing cooling and cleaning operations on solar panels using rainwater. However, it requires a configuration for circulating rainwater and does not address the cooling structure of batteries and LEDs.

Korean Patent Publication No. 10-2022-0005863 (Solar power street lights with built-in battery) allows heat dissipation via an aluminum street lights body, and cooling by air through the space between the body and the blocking plate attached to the upper surface thereof, while blocking direct sunlight to prevent high-temperature heat generation damage. However, since the body is made of high thermal conductivity aluminum, it lacks economic efficiency.

Additionally, during winter, overcooling can reduce battery performance.

SUMMARY OF THE INVENTION

The present disclosure has been made in an effort to solve the problems described above, and an objective of the present disclosure is to provide a solar cell street lights assembly that prevents errors in the electric circuit of the PCB due to high temperature by sequentially cooling the PCB, solar panel, LED module, and battery and by securing a natural wind path, and prevents a decrease in the power generation of the solar panel due to the high temperature of direct sunlight, a decrease in battery performance due to high temperature, and a shortening of the lifespan of the LED.

In addition, another object of the present invention is to provide a solar cell street lights assembly that enables a system for cooling overheated components (battery, LED, PCB, solar cell) to operate without power and enables the battery to heat up to a normal temperature range when it is overcooled.

In addition, further another object of the present invention is to provide a solar cell street lights assembly that improves the structure of a wind fan to increase power generation efficiency regardless of the wind direction, and uses wind power generation to insulate a battery in the winter or minimizes overcooling of the battery, thereby increasing battery efficiency as well as auxiliary charging of the battery.

In addition, further another object of the present invention is to provide a solar cell street lights assembly that prevents contamination of solar panels by birds and allows foreign substances such as sand and fine dust to be smoothly removed by natural ventilation.

According to an aspect of the invention to achieve the object described above, there is provided a solar cell street lights assembly including a vertical pillar fixed to a ground at a lower end thereof and having a first hollow portion formed along its body and an air inlet, through which external air is introduced, communicated with the first hollow portion; a hollow mounting rod obliquely connected upward from an upper end portion of the vertical pillar and having a through-hole communicated with the first hollow portion and a second hollow portion formed along its body; a lower housing having a first receiving portion for receiving a battery formed on one side thereof; a second receiving portion for receiving a PCB formed below the first receiving portion; a mounting hole for mounting a LED module formed on the other side; and one end connected to the mounting rod to be communicated with the second hollow portion; an upper housing mounted on an upper surface portion of the lower housing to form an internal space together with the lower housing and having one end connected to the mounting rod to be communicated with the second hollow portion, an outlet for discharging air introduced through the hollow portions, and a solar panel mounted and fixed on an upper surface thereof; a hollow air conduit for introducing external air from a lower portion thereof arranged parallel to the vertical pillar and connected to the second receiving portion; and at least one air passage pipe having one end connected to the air conduit and passing through the second receiving portion, wherein the external air introduced through the air conduit cools the PCB in the second receiving portion, and the air entering through the hollow portions passes through the vertical pillar, the mounting rod, and the first receiving portion, and is discharged through the outlet to cool the battery and the solar panel.

In addition, the first receiving portion includes an opening for inserting or removing the battery, which also communicates with the internal space and a heat dissipation plate that surrounds at least a portion of the battery, is built therein, so that the heat emitted from the battery is transferred to the heat dissipation plate and the air, which is introduced via the first and second hollow portions, passes close to the heat dissipation plate and is discharged through the outlet together with the heat emitted from the battery.

In addition, an air guide is detachably coupled adjacent to the first receiving portion and guides the air introduced from the mounting rod to the outlet and includes a top plate facing the opening of the first receiving portion, a pair of side plates formed to face each other at edges of the top plate, a plurality of air pipes coupled to the side plates at both ends and through which the air introduced from the mounting rod passes, and an arc-shaped guide plate extending from the side plates to guide the air, that has passed through the air pipes, toward the outlet.

In addition, a heat dissipation block is provided to dissipate heat generated by the LED module, at least one of the air pipes among the plurality of the air pipes is arranged to pass through the arc-shaped guide plate while being connected to the heat dissipation block, and the external air passing through the air pipe is discharged to an outside of the lower housing.

In addition, the upper housing includes a first inflow groove that is formed on an outer surface thereof and through that rainwater flows therein through the gap between the solar panels, a collection groove formed to store the rainwater flowing therein through the first inflow groove, and a second inflow groove formed at an edge thereof to allow an external air to flow therein.

In addition, the solar cell street lights assembly further includes a blocking member that blocks both sides and an upper portion of the inlet of the vertical pillar; a bottom member that blocks a lower portion of the inlet and has multiple through-holes; and a collection member, which surrounds a periphery of the bottom member, has an open top and is formed in a tapered shape that is wider at the top and narrower at the bottom, with a drainage hole formed at a lower end thereof, so that when snow accumulates, it is collected in the collection member and blocks the through-holes of the bottom member, and when the snow melts, the water is discharged through the drainage hole, thereby opening the through-hole.

In addition, the solar cell street lights assembly further includes a rotating shaft rotatably supported on the mounting rod; a fan member rotatably coupled to the rotating shaft and rotated by natural wind power; and a generator that generates power by the rotation of the fan member.

In addition, the solar cell street lights assembly further includes a nozzle connected to an upper end portion of the air conduit, which blows external air from a bottom of the air conduit toward the solar panel.

In addition, the solar cell street lights assembly further includes an opening and closing means for opening or closing the through-hole).

In addition, wherein the opening and closing means includes a rotating cylinder rotatably connected to the mounting rod and having an opening formed to open the through-hole, an actuation lever connected to the rotating cylinder at one end thereof, and an actuator connected to the other end of the actuation lever, which drives the lever's movement, so that the rotating cylinder rotates according to the operation of the actuator to open or close the through-hole.

In addition, the fan member includes an upper rotating plate having an inclined surface and a drainage hole connected to the upper end of a rotating shaft, a lower rotating plate having an inclined surface and a drainage hole connected to the lower end of the rotating shaft, a plurality of side blades for interconnecting the upper rotating plate and the lower rotating plate arranged at regular intervals, and a plurality of inclined blades having both ends fixed to the mutually adjacent side blades and arranged in an inclined manner up and down.

BRIEF DESCRIPTION OF THE DRAWINGS

The above and other objects, features and advantages of the present invention will be more apparent from the following detailed description taken in confluence with the accompanying drawings, in which.

[Reference Signs List]

Figure 1A:
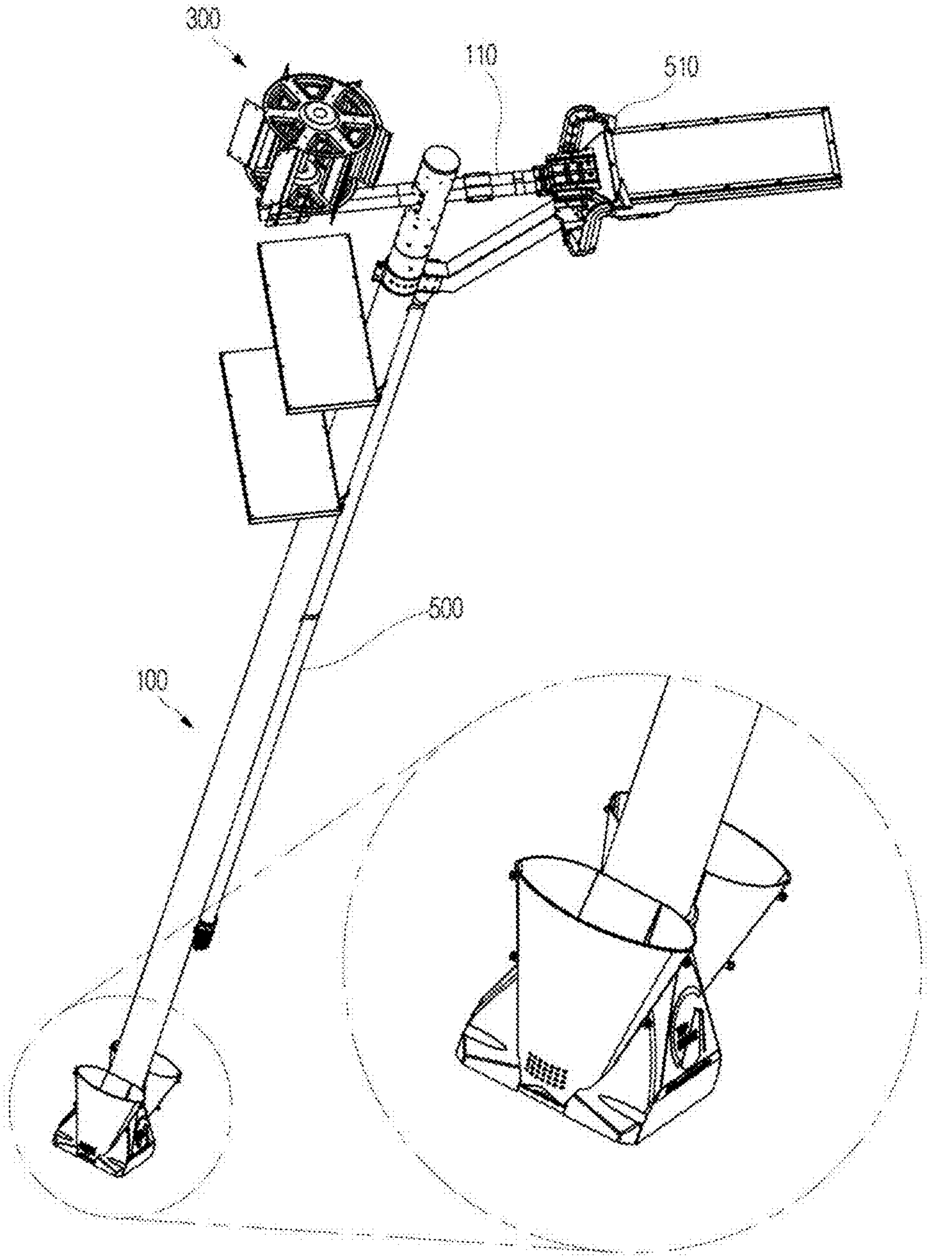
FIG. 1A is a perspective view of a street lights in the first embodiment of the present invention.

| | |
|---|---|
| 100: | Vertical pillar |
| 101: | First hollow portion |
| 102: | Inlet |

-continued

| [Reference Signs List] | |
|---|---|
| 110: | Mounting rod |
| 112: | Second hollow portion |
| 113: | Coupling tube |
| 120: | Lower housing |
| 121: | First receiving portion |
| 123: | Second receiving portion |
| 124: | Heat dissipation plate |
| 129: | Air passage pipe |
| 130: | Upper housing |
| 131: | Outlet |
| 132: | First inflow groove |
| 140: | Air guide |
| 141: | Upper plate |
| 142: | Side plate |
| 143: | Air pipe |
| 144: | Arc-shaped guide plate |
| 150: | Rotating cylinder |
| 151: | Opening hole |
| 155: | Actuator |
| 300: | Fan member |
| 500: | Air conduit |
| 510: | Nozzle |
| 520: | Connection tube |
| 521: | Connection hose |
| 600: | Heat dissipation block |

DETAILED DESCRIPTION OF THE PREFERRED EMBODIMENT

The street lights assembly of the present invention is configured to use a natural airflow path to cool a solar panel, a LED module, and a battery, thereby preventing reduced power output from the solar panel due to heat, battery degradation, and shortening of the LED's lifespan caused by high temperatures.

Referring to FIG. 1 through FIG. 4, the street lights assembly 20 of one embodiment of the present invention integrates the battery and the LED module (700) within a single housing, with the solar panel (not shown) mounted and fixed on top of the housing.

The street lights assembly of one embodiment of the present invention includes a vertical pillar (100), a mounting rod (110), a fan member (300), a lower housing (120), and an upper housing (130).

The vertical pillar (100) is fixed to a ground at the lower end thereof and has a first hollow portion (101) formed along its body and air inlets (102), through which external air is introduced, communicated with the first hollow portion (101).

The mounting rod (110) is obliquely connected upward from an upper end portion of the vertical pillar (100) and has a through-hole (111) communicating with the first hollow portion (101) and a second hollow portion (112) formed along its body.

At the lower end portion of the vertical pillar (100), it is provided with a blocking member (30) that blocks both sides and the upper portion of the inlet (102) and a bottom member (31) that blocks the lower portion of the inlet (102) and includes multiple through-holes (31*a*).

These through-holes control the airflow entering via the inlet (102), thereby adjusting the cooling effect at the top of the street lights depending on the season (summer or winter). They also prevent external foreign substances from entering the inlet (102), thereby preventing contamination thereof.

In the meantime, a collection member (40), which surrounds the periphery of the bottom member (31), has an open top and is formed in a tapered shape that is wider at the top and narrower at the bottom, with a drainage hole (41) formed at the lower end. When snow accumulates, it is collected in the collection member (40) and blocks the through-holes (31*a*) of the bottom member (31). When the snow melts, the water is discharged through the drainage hole (41), thereby opening the through-hole (31*a*). As such, the through-holes (31*a*) are opened or closed in response to winter weather conditions.

The lower housing (120) includes a first receiving portion (121) formed on one side thereof to receive the battery, a second receiving portion (123) formed below the first receiving portion (121), where the PCB is received, a mounting hole (122) for mounting a LED module (700) formed on the other side, and one end connected to the mounting rod (110) to be communicated with the second hollow portion (112).

The upper housing (130) is mounted on an upper surface portion of the lower housing (120) to form an internal space (A) together with the lower housing (120). One end of the upper housing (130) is also connected to the mounting rod (110) to be communication with the second hollow portion (112). An outlet (131) is formed to discharge the air entering through the first and second hollow portions (101 and 112). A solar panel (2) is mounted and fixed on an upper surface of the upper housing (130).

In the meantime, a hollow air conduit (500) is arranged parallel to the vertical pillar (100).

The hollow air conduit (500) draws the external air from a lower portion thereof and is connected to the second receiving portion (123). A plurality of air passage pipe (129), through which external air is supplied, are arranged in the second receiving portion (123) via a connection tube (520) and a connection hose (521) that are connected to the upper end of the air conduit (500).

The external air introduced through the air conduit (500) is discharged via the air passage pipes (129), thereby cooling the PCB received in the second receiving portion (123).

Meanwhile, external air entering the first and second hollow portions (101 and 112) passes through the vertical pillar (100), the mounting rod (110), and the first receiving portion (121) and then, is discharged through the outlet (131), thereby cooling both the battery and the solar panel.

Referring to FIG. 4, FIG. 7, FIG. 8, and FIG. 15, an air guide (140) is detachably coupled adjacent to the first receiving portion (121) and guides the air introduced from the mounting rod (110) to the outlet (131).

The air guide (140) includes a top plate (141) facing the opening (121*a*) of the first receiving portion (120), a pair of side plates (142) formed to face each other at edges of the top plate (141), a plurality of air pipes (143) coupled at both ends to the side plates (142) and through which the air introduced from the mounting rod (110) passes, and an arc-shaped guide plate (144) extending from the side plates (142) to guide the air, that has passed through the air pipes (143), toward the outlet (131).

The air guide (140) configured as described above guides external air introduced through the mounting rod (110) toward the arc-shaped guide plate (144) via a plurality of air pipes (143), so that the air is discharged to the outside through the outlet (131) of the upper housing (130) and the air discharged through the outlet (131) cools the solar panel.

Meanwhile, among the multiple air pipes (143), at least one air pipe (143*a*) is disposed to pass through the arc-shaped guide plate (144) and extends over the upper side of the LED module (700), thereby cooling the heat generated from the LED module (700).

Figure 9:
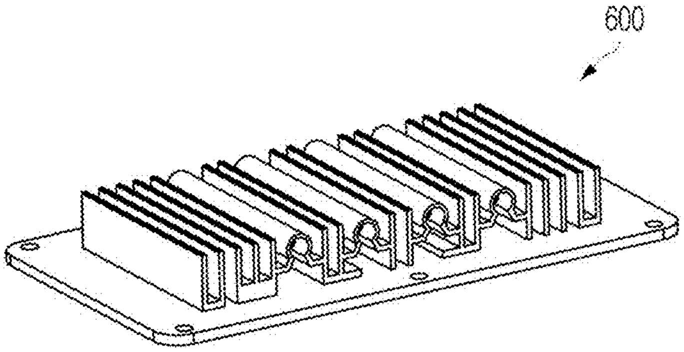
FIG. 9 is a perspective view of the heat dissipation block.
Figure 10A:
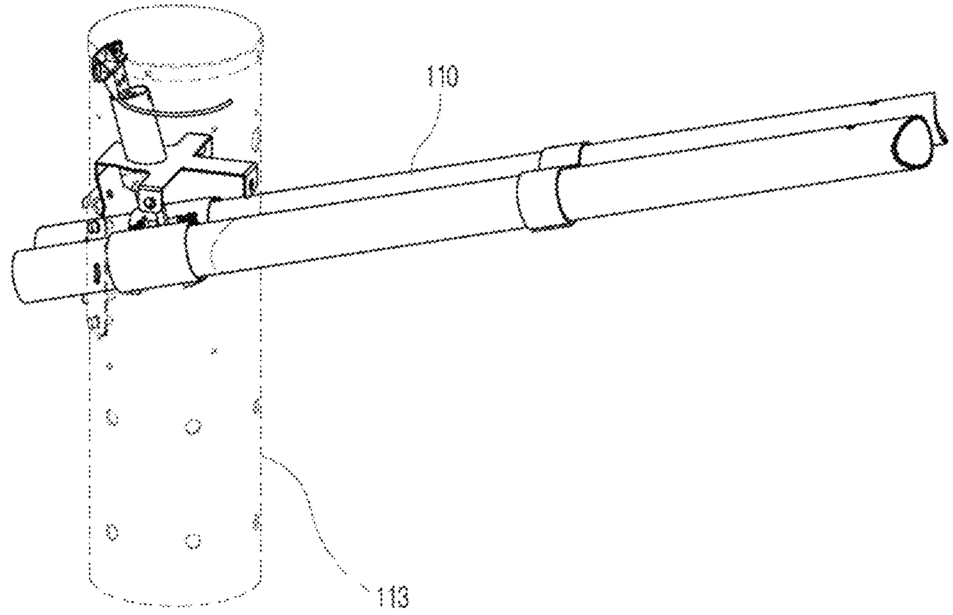
FIG. 10A is an image showing an upper portion of a pillar.
Figure 10B:
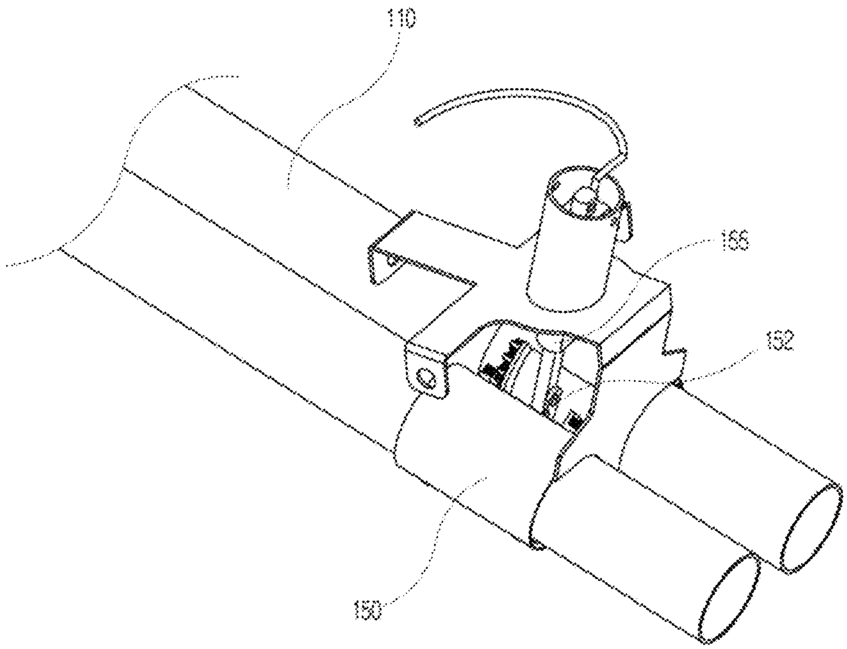
FIG. 10B is a perspective view of an opening and closing means for a through-hole of a mounting rod.
Figure 10C:
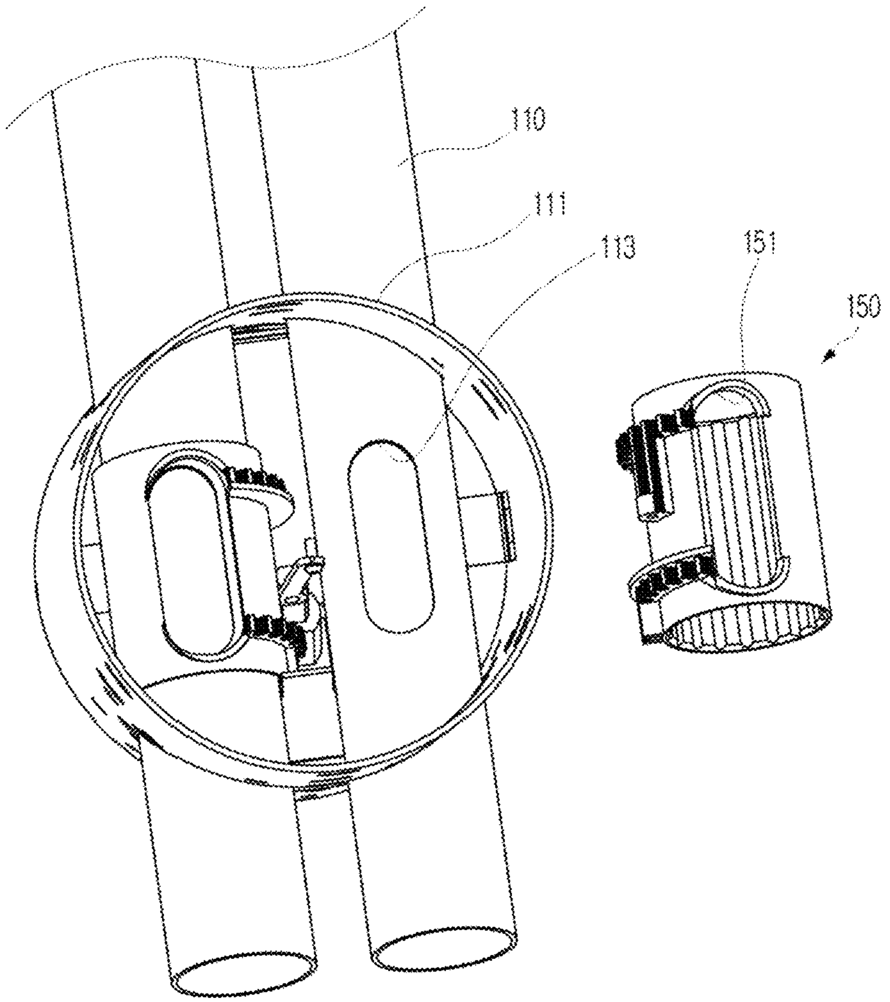
FIG. 10C and FIG. 10D are views showing open and closed states of a through-hole.
Figure 10D:
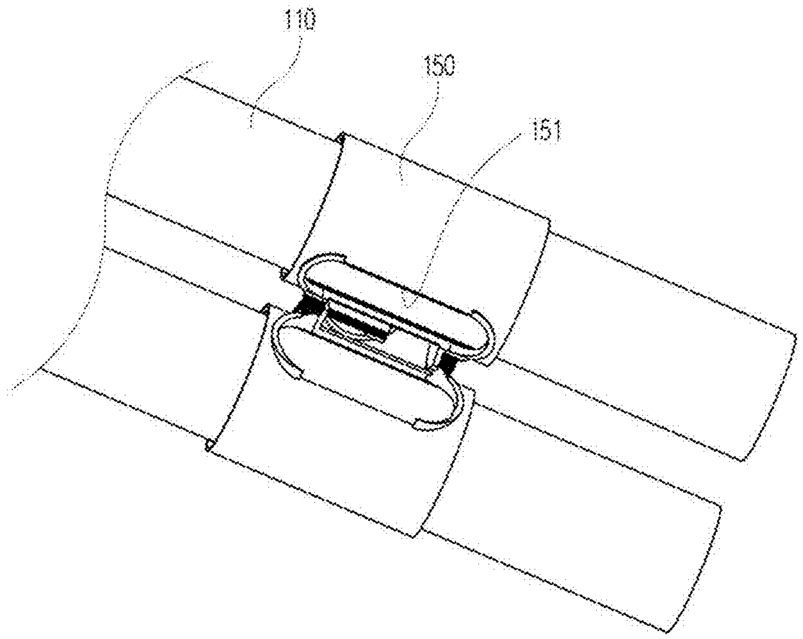
Figure 10E:
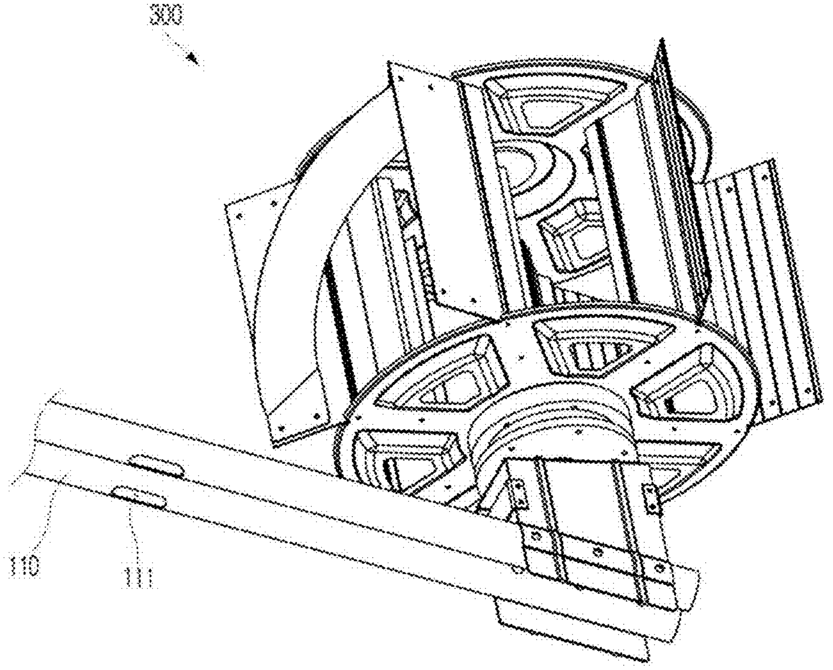
FIG. 10E is a perspective view showing a mounting rod with a through-hole.
Figure 11:
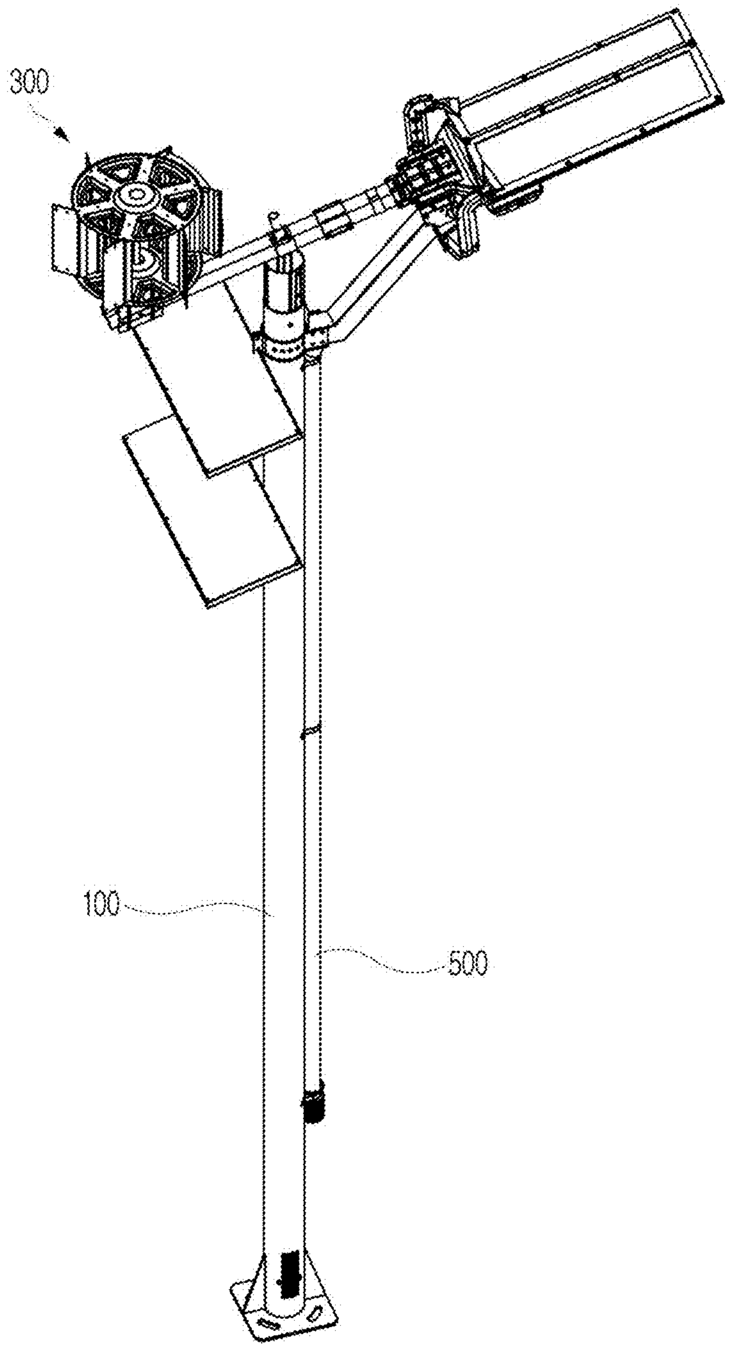
FIG. 11 is a perspective view showing another example of a street lights assembly.
Figure 12:
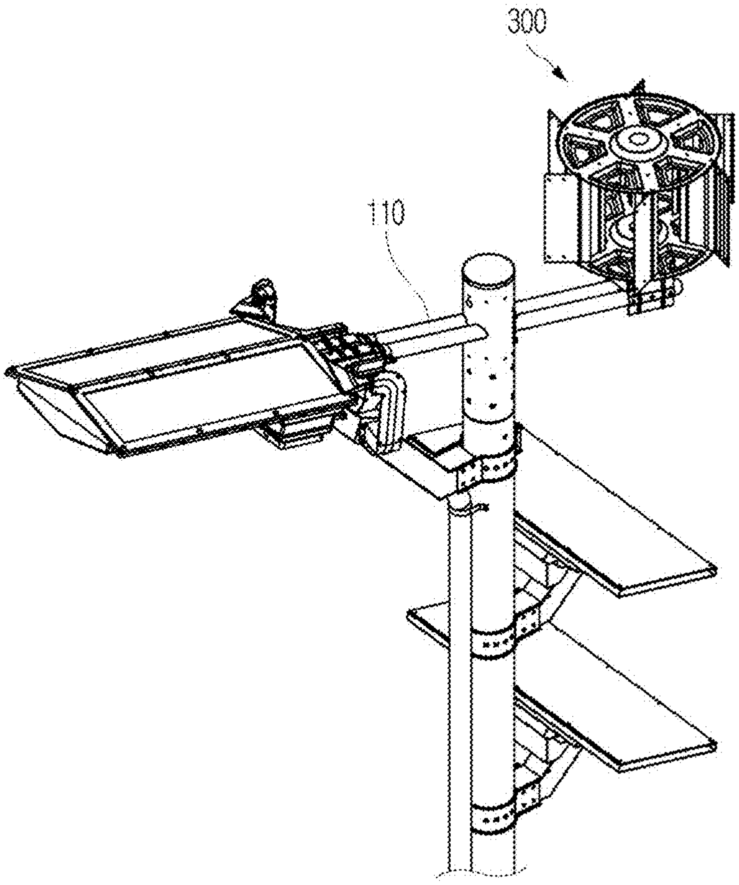
FIG. 12 is a perspective view of a key portion of FIG. 11.
Figure 13:
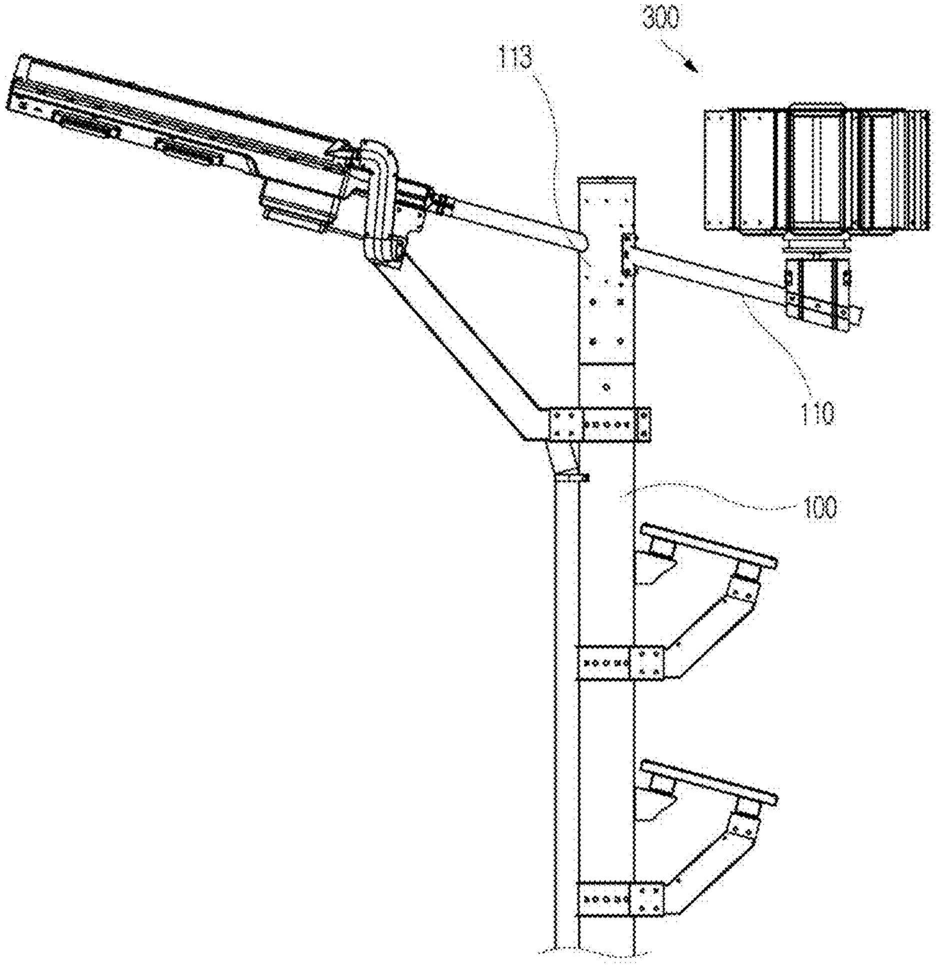
FIG. 13 is a side cross-sectional view of FIG. 12.

Referring to FIG. 9, the heat dissipation block (600), which contacts the LED module (700), is connected to the air pipe (143*a*) to improve cooling performance.

Meanwhile, another solar panel (2) is mounted on the other side of the vertical pillar (100), thereby increasing the power generation. By arranging the solar panels (1 and 2) on both sides of the vertical pillar (100), the streetlight can be stably erected.

Figure 4:
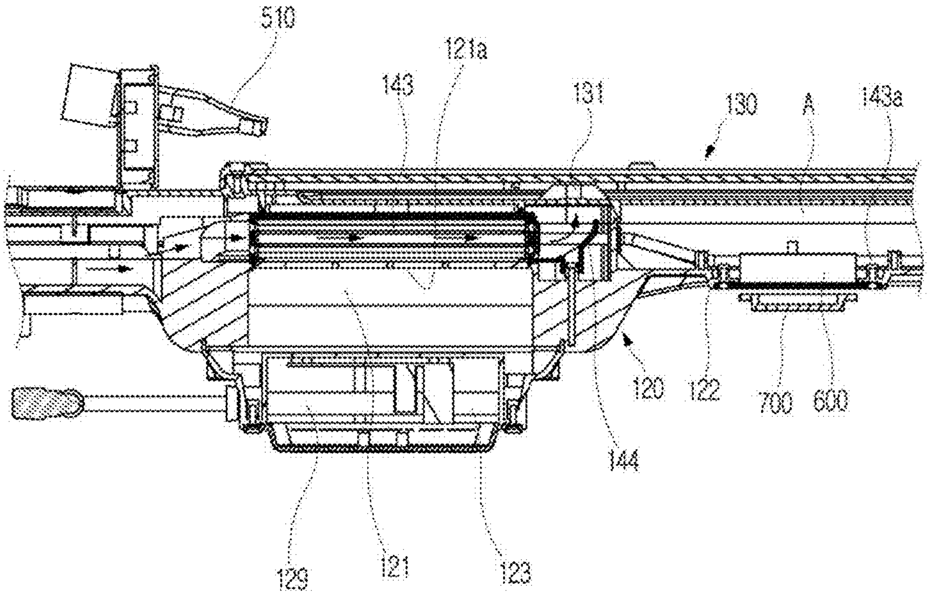
FIG. 4 is a partial cross-sectional view of FIG. 3.
Figure 5:
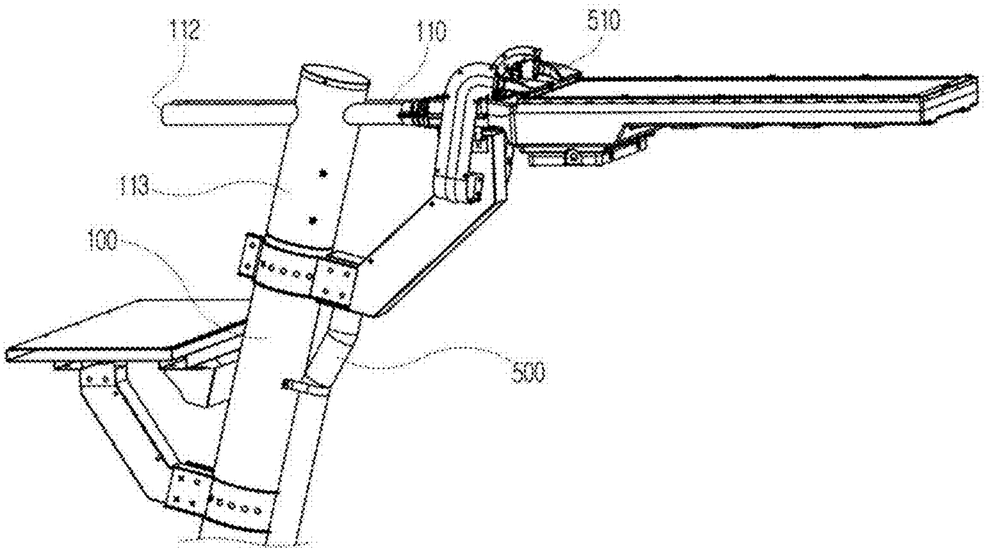
FIG. 5 is a perspective view of a key portion of FIG. 1*a*.
Figure 6:
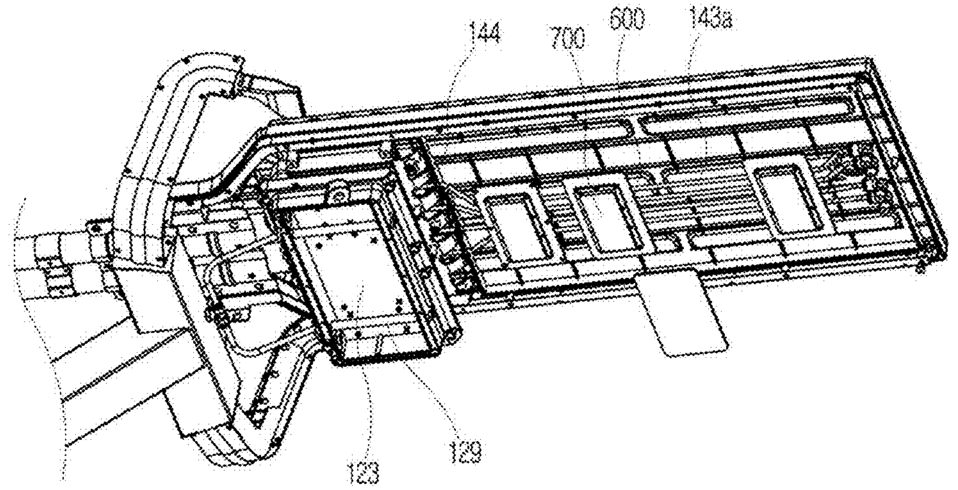
FIG. 6 is an exploded perspective view of a key portion of a lighting unit.
Figure 7:
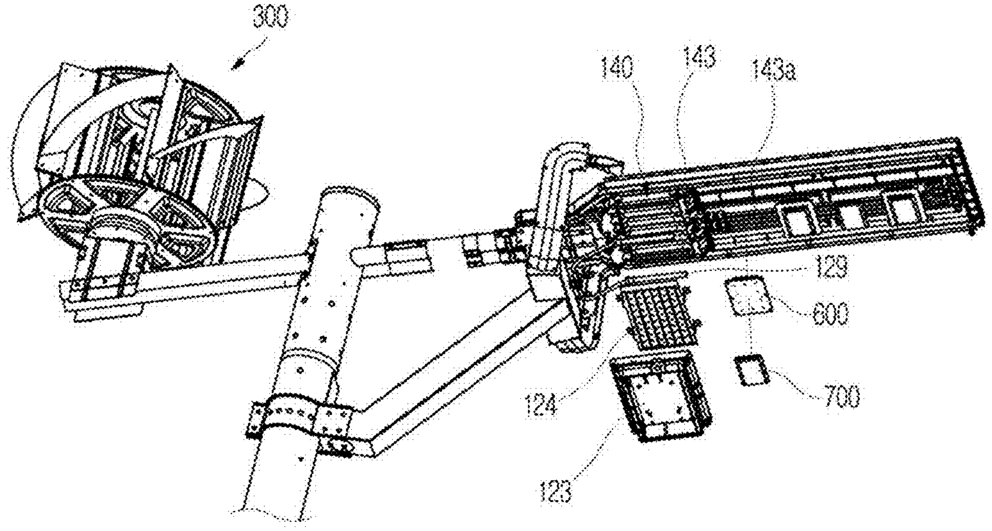
FIG. 7 is an exploded view of a key portion of FIG. 6.
Figure 8:
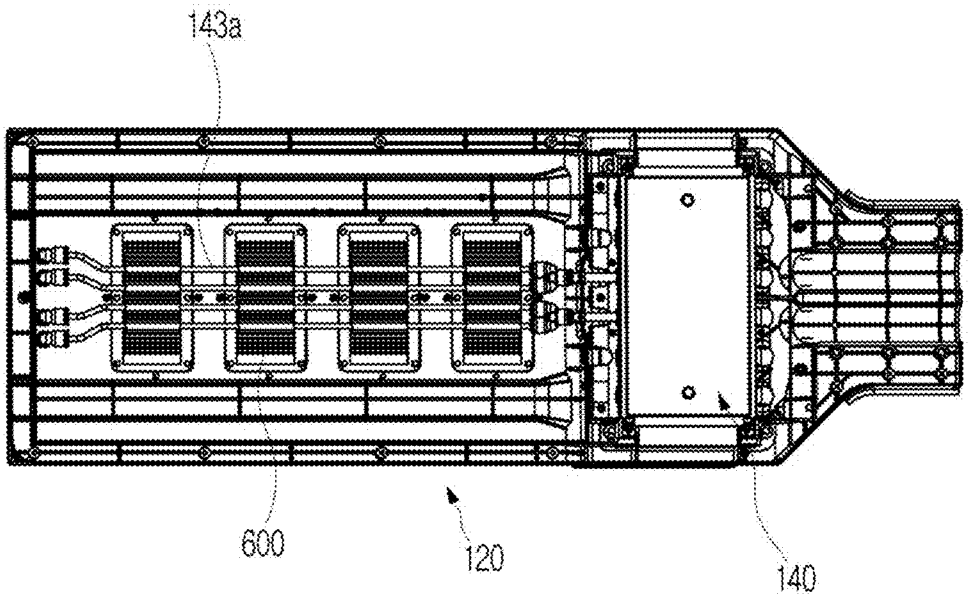
FIG. 8 is a sample photo showing a lower housing.

As shown in FIG. 4, FIG. 6, and FIG. 7, the first receiving portion (121) includes an opening (121*a*) for inserting or removing the battery, which also communicates with the internal space (A). A heat dissipation plate that surrounds at least a portion of the battery, is built therein, so that the heat emitted from the battery is transferred to the heat dissipation plate (124) and the air, which is introduced via the first and second hollow portions (101, 112), passes close to the heat dissipation plate (124) and is discharged through the outlet (131) together with the heat emitted from the battery.

Figure 1B:
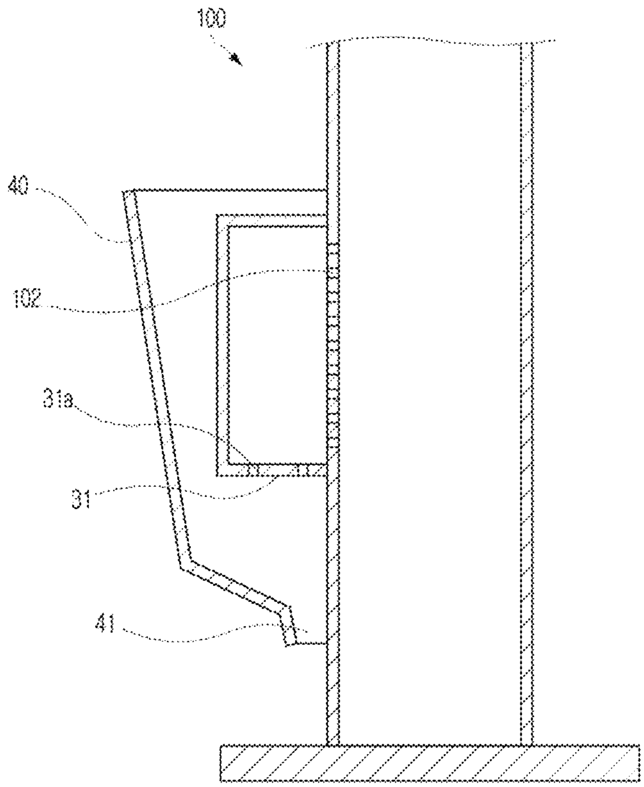
FIG. 1B is a cross-sectional view of the lower part of the pillar in another example of FIG. 1A.
Figure 2:
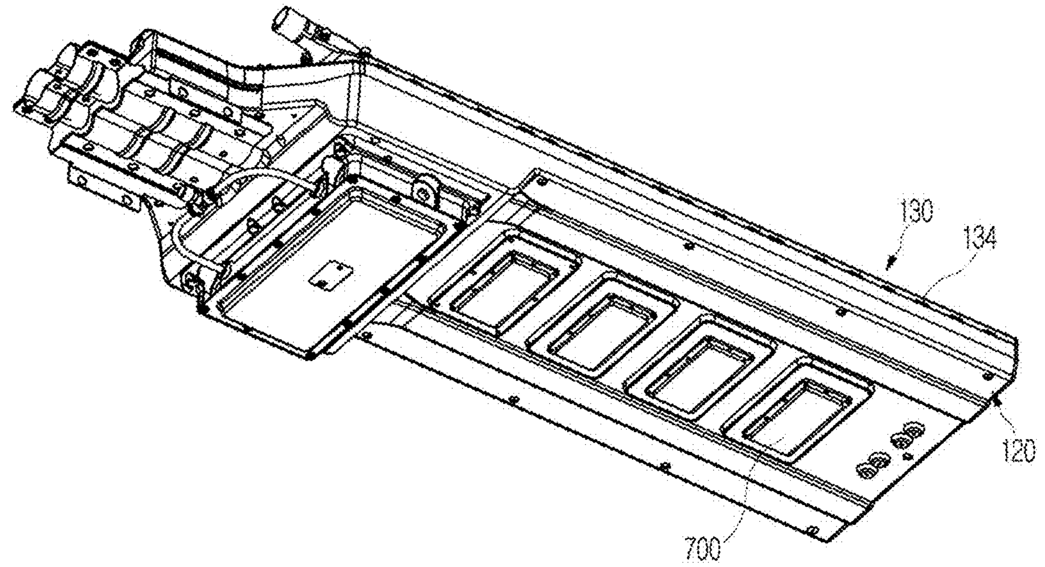
FIG. 2 is a bottom perspective view of a lighting unit of a street light of FIG. 1*a;*
Figure 3:
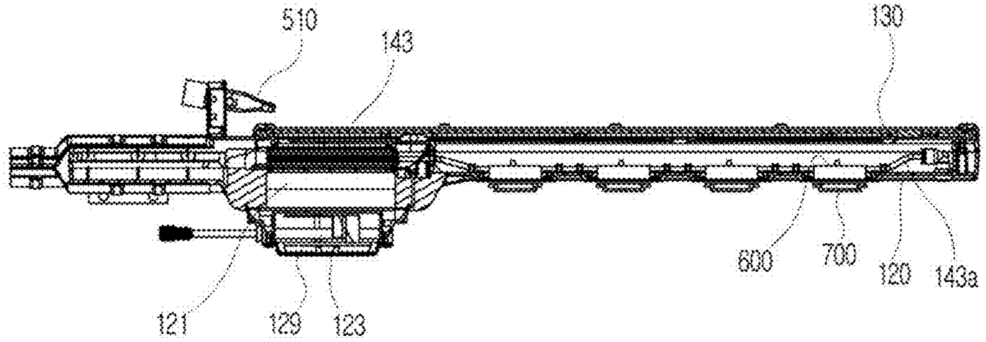
FIG. 3 is a cross-sectional view of FIG. 2.

Referring to FIG. 1, a fan member (300) that rotates by natural wind is mounted on the mounting rod (110). The street lights assembly according to one embodiment of the present invention includes a generator (not shown) that generates electricity by the rotation of the fan member (300), a protective member (not shown) that surrounds the battery and has a heating wire that receives electric energy from the generator and generates heat, a sensor member that senses the heating temperature of the battery, and a switch that selectively supplies electric energy generated from the generator to the battery or the heating wire according to the sensing temperature of the sensor member.

Figure 16:
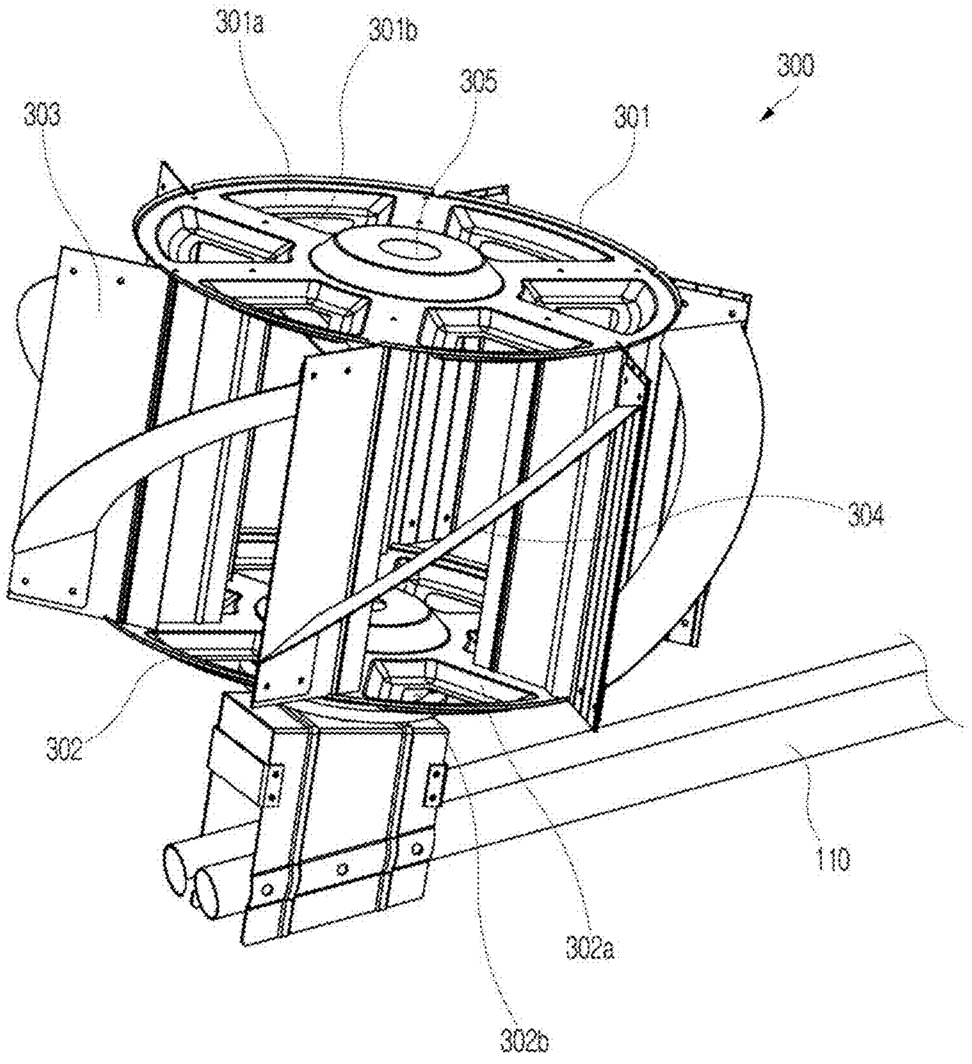
FIG. 16 is a perspective view showing another example of a fan member.

Referring to FIG. 16, the fan member (300) includes an upper rotating plate (301) having an inclined surface (301*a*) and a drainage hole (301*b*) connected to the upper end of a rotating shaft (305), a lower rotating plate (302) having an inclined surface (302*a*) and a drainage hole (302*b*) connected to the lower end of the rotating shaft (305), a plurality of side blades (303) for interconnecting the upper rotating plate (301) and the lower rotating plate (302) arranged at regular intervals, and a plurality of inclined blades (304) having both ends fixed to the mutually adjacent side blades (303) and arranged in an inclined manner up and down.

The fan member (300) as described above rotates smoothly when wind or snow hits the inclined surfaces (301*a* and 302*a*) and the side blades (303), and in particular, when rainwater falls on the inclined blades (304), the rotation of the fan member (300) becomes more smoothly.

This wind-powered generation system helps to maintain battery warmth in winter and minimize overcooling, thereby preventing a decrease in the power generation capacity of the battery, while also providing auxiliary charging to the battery.

Meanwhile, the street lights assembly of one embodiment of the present invention may be provided with an alarm member that generates an alarm sound, high frequency or low frequency, when a bird approaches the upper housing (130), thereby preventing the approach of birds and preventing contamination of the solar panel by excrement so as to improve power generation efficiency thereof.

In addition, a convex mirror may be placed on the edge of the upper housing (130) to prevent birds from approaching, and a reflective sticker can be attached to the blade of the fan member (300) to prevent birds from approaching.

Referring to FIG. 1 to FIG. 5, the street lights assembly is also equipped with a nozzle (510) connected to the connection tube (520), which blows external air from the bottom of the air conduit (500) toward the solar panel. This improves power generation efficiency by removing foreign substances such as sand that contaminate the solar panels through ventilation.

Meanwhile, referring to FIG. 1 and FIG. 10*a* to FIG. 10*e*, the streetlight assembly of one embodiment of the present invention has an opening and closing means for opening and closing the through-hole (111).

The opening and closing means includes a rotating cylinder (150) rotatably connected to the mounting rod (110) and having with an opening (151) formed to open the through-hole (111), an actuation lever (152) connected to the rotating cylinder (150) at one end thereof, and an actuator (155) connected to the other end of the actuation lever (152), which drives the lever's movement, so that the rotating cylinder (150) rotates according to the operation of the actuator (155) to open or close the through-hole (111).

The actuator (155) can operate automatically based on weather conditions or be remotely controlled from the ground.

The above-described opening and closing means opens and closes a path that supplies the external air to the internal space (A) depending on the area where the streetlight is installed, thereby controlling the cooling state of the streetlight components (battery, LED, solar panel).

FIG. 11 to FIG. 14 illustrate another embodiment of the present invention. As shown, a pair of solar panels are arranged in a roof shape, enabling long-term charging in response to changes in the angle of incidence of sunlight due to the Earth's rotation and revolution.

Figure 14:
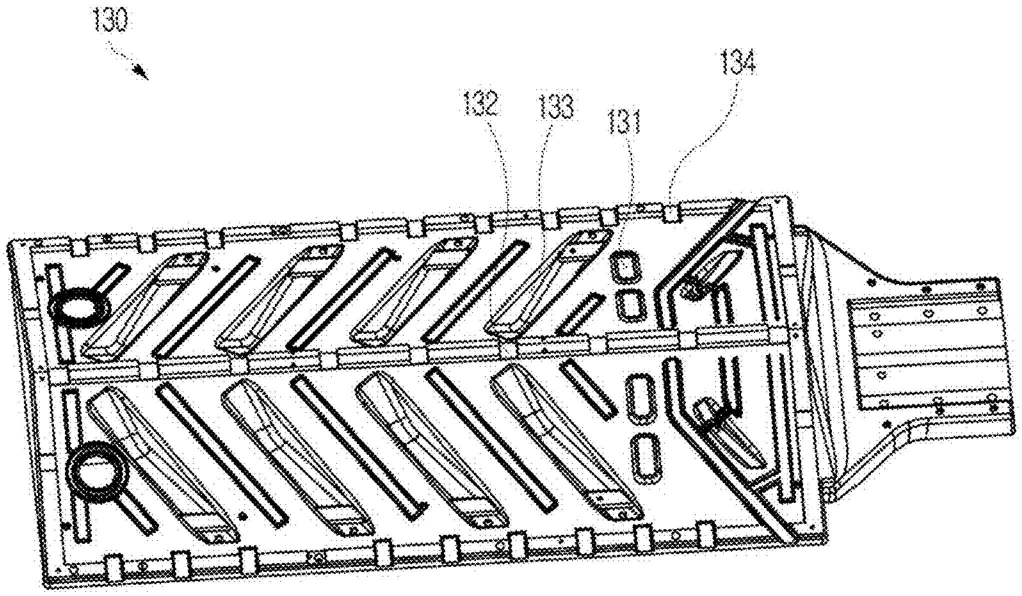
FIG. 14 is a sample photo showing an upper housing of FIG. 11.
Figure 15:
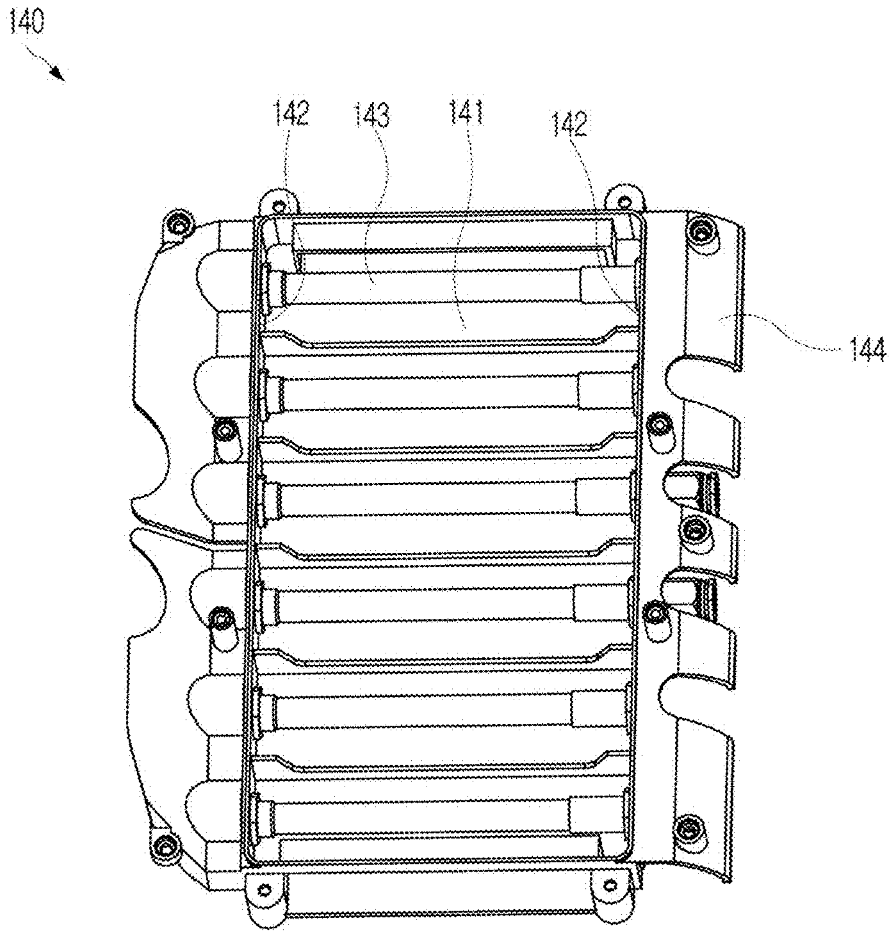
FIG. 15 is a sample photo of an air guide and ab air pipe.

As shown in FIG. 14, the upper housing (130) includes a first inflow groove (132) that is formed on an outer surface thereof and through that rainwater flows therein through the gap between the solar panels, a collection groove (133) formed to store the rainwater flowing in through the first inflow groove (132), and a second inflow groove (134) formed at an edge thereof to allow an external air to flow therein.

These features allow the collected rainwater in the collection groove (133) to evaporate and simultaneously allow the external air through the second inflow groove (134), thus enhancing the cooling efficiency of the solar panel (1).

According to the present invention described above, the street lights assembly of the present invention improves the natural wind path using as the vertical pillar (100), the mounting rod (110), the air passage pipe (129), the air guide (140), the outlet (131), and the air pipe (143) to cool the PCB, the solar panel, the LED module, and the battery, thereby preventing the reduction in the power generation of the solar panel due to the high temperature of direct sunlight, the deterioration of the battery performance due to the high temperature, and the shortening of the lifespan of the LED.

Additionally, the present invention uses wind power generation to keep the battery warm during winter and reduce overcooling, thus preventing performance drops and allowing for auxiliary charging of the battery.

The present invention also generates alarm sounds to deter birds, preventing contamination of the solar panel by bird droppings. Moreover, it uses natural ventilation to effectively remove foreign substances such as sand and dust.

While the present invention has been described with respect to the specific embodiments, it will be apparent to those skilled in the art that various changes and modifications may be made without departing from the spirit and scope of the invention as defined in the following claims.

What is claimed is:

1. A solar cell street lights assembly comprising:

a vertical pillar (100) fixed to a ground at a lower end thereof and having a first hollow portion (101) formed along its body and an air inlet, through which external air is introduced, communicated with the first hollow portion (101);

a hollow mounting rod (110) obliquely connected upward from an upper end portion of the vertical pillar (100) and having a through-hole (111) communicated with the first hollow portion (101) and a second hollow portion (112) formed along its body;

a lower housing (120) having a first receiving portion (121) for receiving a battery formed on one side thereof; a second receiving portion (123) for receiving a PCB formed below the first receiving portion (121); a mounting hole (122) for mounting a LED module (700) formed on the other side; and one end connected to the mounting rod (110) to be communicated with the second hollow portion (112);

an upper housing (130) mounted on an upper surface portion of the lower housing (120) to form an internal space (A) together with the lower housing (120) and having one end connected to the mounting rod (110) to be communicated with the second hollow portion (112), an outlet (131) for discharging air introduced through the hollow portions (101, 112), and a solar panel mounted and fixed on an upper surface thereof;

a hollow air conduit (500) for introducing external air from a lower portion thereof arranged parallel to the vertical pillar (100) and connected to the second receiving portion (123); and at least one air passage pipe (129) having one end connected to the air conduit (500) and passing through the second receiving portion (121), wherein the external air introduced through the air conduit (500) cools the PCB in the second receiving portion (123), and the air entering through the hollow portions (101, 112) passes through the vertical pillar (100), the mounting rod (110), and the first receiving portion (121), and is discharged through the outlet (131) to cool the battery and the solar panel.

2. The solar cell street lights assembly of claim 1, wherein the first receiving portion (121) includes an opening (121*a*) for inserting or removing the battery, which also communicates with the internal space (A) and a heat dissipation plate (124) that surrounds at least a portion of the battery, is built therein, so that the heat emitted from the battery is transferred to the heat dissipation plate (124) and the air, which is introduced via the first and second hollow portions (101, 112), passes close to the heat dissipation plate (124) and is discharged through the outlet (131) together with the heat emitted from the battery.

3. The solar cell street lights assembly of claim 2, wherein an air guide (140) is detachably coupled adjacent to the first receiving portion (121) and guides the air introduced from the mounting rod (110) to the outlet (131) and includes a top plate (141) facing the opening (121*a*) of the first receiving portion (120), a pair of side plates (142) formed to face each other at edges of the top plate (141), a plurality of air pipes (143) coupled to the side plates (142) at both ends and through which the air introduced from the mounting rod (110) passes, and an arc-shaped guide plate (144) extending from the side plates (142) to guide the air, that has passed through the air pipes (143), toward the outlet (131).

4. The solar cell street lights assembly of claim 3, wherein a heat dissipation block (600) is provided to dissipate heat generated by the LED module, at least one of the air pipes (143*a*) among the plurality of the air pipes (143) is arranged to pass through the arc-shaped guide plate (144) while being connected to the heat dissipation block (600), and the external air passing through the air pipe (143*a*) is discharged to an outside of the lower housing.

5. The solar cell street lights assembly of claim 1, wherein the upper housing (130) includes a first inflow groove (132) that is formed on an outer surface thereof and through that rainwater flows therein through the gap between the solar panels, a collection groove (133) formed to store the rainwater flowing therein through the first inflow groove (132), and a second inflow groove (134) formed at an edge thereof to allow an external air to flow therein.

6. The solar cell street lights assembly of claim 3, further comprising:

a blocking member (30) that blocks both sides and an upper portion of the inlet of the vertical pillar (100);

a bottom member (31) that blocks a lower portion of the inlet (102) and has multiple through-holes (31*a*); and a collection member (40), which surrounds a periphery of the bottom member (31), has an open top and is formed in a tapered shape that is wider at the top and narrower at the bottom, with a drainage hole (41) formed at a lower end thereof, so that when snow accumulates, it is collected in the collection member (40) and blocks the through-holes (31*a*) of the bottom member (31), and when the snow melts, the water is discharged through the drainage hole (41), thereby opening the through-hole (31*a*).

7. The solar cell street lights assembly of claim 3, further comprising:

a rotating shaft (305) rotatably supported on the mounting rod (110);

a fan member (300) rotatably coupled to the rotating shaft and rotated by natural wind power; and a generator that generates power by the rotation of the fan member (300).

8. The solar cell street lights assembly of claim 1, further comprising a nozzle (510) connected to an upper end portion of the air conduit (500), which blows external air from a bottom of the air conduit (500) toward the solar panel.

9. The solar cell street lights assembly of claim 1, further comprising an opening and closing means for opening or closing the through-hole (111).

10. The solar cell street lights assembly of claim 9, wherein the opening and closing means includes a rotating cylinder (150) rotatably connected to the mounting rod (110) and having an opening (151) formed to open the through-hole (111), an actuation lever (152) connected to the rotating cylinder (150) at one end thereof, and an actuator (155) connected to the other end of the actuation lever (152), which drives the lever's movement, so that the rotating cylinder (150) rotates according to the operation of the actuator (155) to open or close the through-hole (111).

11. The solar cell street lights assembly of claim 7, wherein the fan member (300) includes an upper rotating plate (301) having an inclined surface (301*a*) and a drainage hole (301*b*) connected to the upper end of a rotating shaft (305), a lower rotating plate (302) having an inclined surface (302*a*) and a drainage hole (302*b*) connected to the lower end of the rotating shaft (305), a plurality of side blades (303) for interconnecting the upper rotating plate (301) and the lower rotating plate (302) arranged at regular intervals, and a plurality of inclined blades (304) having both ends fixed to the mutually adjacent side blades (303) and arranged in an inclined manner up and down.

* * * * *